(12) United States Patent
Jania

(10) Patent No.: US 8,713,423 B2
(45) Date of Patent: Apr. 29, 2014

(54) AUTOMATED DYNAMIC DIFFERENTIAL DATA PROCESSING

(75) Inventor: Frank Lawrence Jania, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 12/413,525

(22) Filed: Mar. 28, 2009

(65) Prior Publication Data

US 2010/0251091 A1    Sep. 30, 2010

(51) Int. Cl.
*G06F 17/00* (2006.01)

(52) U.S. Cl.
USPC ............................. 715/219; 715/212; 715/220

(58) Field of Classification Search
USPC .......................................... 715/219, 212, 220
See application file for complete search history.

(56) References Cited

U.S. PATENT DOCUMENTS

| | | | | |
|---|---|---|---|---|
| 5,390,296 | A * | 2/1995 | Crandall et al. | 715/835 |
| 6,167,383 | A * | 12/2000 | Henson | 705/26.5 |
| 6,327,592 | B1 * | 12/2001 | Yoshikawa | 715/219 |
| 6,430,584 | B1 * | 8/2002 | Comer et al. | 715/212 |
| 7,146,561 | B2 * | 12/2006 | Bauchot et al. | 715/212 |
| 7,231,593 | B1 * | 6/2007 | Raja et al. | 715/210 |
| 7,478,317 | B2 * | 1/2009 | Andrews | 715/213 |
| 7,516,114 | B2 * | 4/2009 | Dieberger et al. | 715/212 |
| 7,984,371 | B2 * | 7/2011 | Zdenek | 715/212 |
| 2006/0069696 | A1 * | 3/2006 | Becker et al. | 707/102 |
| 2007/0198911 | A1 * | 8/2007 | Nilakantan et al. | 715/509 |
| 2008/0046803 | A1 * | 2/2008 | Beauchamp et al. | 715/212 |
| 2008/0104498 | A1 * | 5/2008 | Molander et al. | 715/212 |
| 2008/0140653 | A1 * | 6/2008 | Matzke et al. | 707/6 |
| 2009/0228776 | A1 * | 9/2009 | Folting et al. | 715/219 |
| 2009/0319880 | A1 * | 12/2009 | Collie et al. | 715/219 |

OTHER PUBLICATIONS

Karnes J, Distance Finder, Jul. 29, 2004. Retrieved from http://www.mindspring.com/~jackkarnes/distan97.zip.*
Postcode.org.uk website, Apr. 6, 2004. URL http://www.postcode.org.uk/country/uk/_UK-PostCode-List.asp retrieved via Internet Archive WaybackMachine.*
Microsoft Excel 2003, Sep. 17, 2007, Microsoft Corporation, Microsoft Office Excel 2003 (11.8169.8172) SP3.*
Tittel, Ed and Mary C. Burmeister. HTML 4 for Dummies, 2005. Wiley Publishing Inc., 5th edition, pp. 65-66.*
Microsoft Office Service Pack 3 download page, Sep. 17, 2007, Microsoft Corporation. Retrieved from http://www.microsoft.com/downloads/en/details.aspx?FamilyId=e25b7049-3e13-433b-b9d2-5e3c1132f206&displaylang=en.*

(Continued)

*Primary Examiner* — Chau Nguyen
(74) *Attorney, Agent, or Firm* — Lee Law, PLLC; Christopher B. Lee

(57) ABSTRACT

A request for differential data relative to a first data element within a group of data elements is received via a user input device. A first differential data value for each of the group of data elements relative to the first data element is calculated. The first differential data value for each of the group of data elements relative to the first data element are displayed on a display in response to the received request. This abstract is not to be considered limiting, since other embodiments may deviate from the features described in this abstract.

25 Claims, 7 Drawing Sheets

(56) References Cited

OTHER PUBLICATIONS

ActiveCell Property—Microsoft Excel 2003 Language Reference, Sep. 27, 2004, Microsoft Corporation. Online help executable retrieved from http://www.microsoft.com/downloads/en/details.aspx?familyid=2204a62e-4877-4563-8e83-4848dda796e4&displaylang=en.*
Message Board Hall of Fame—Color Banding to Current Cell, Feb. 24, 2008, MrExcel.com. Retrieved from http://replay.waybackmachine.org/20080224171629/http://www.mrexcel.com/hof001.php by Internet Archive WayBack Machine (original URL was http://www.mrexcel.com/hof001.php).*
Use JQuery to calculate and display price difference between selected radio button options, Dec. 8, 2009, Experts-Exchange. Retrieved from http://www.experts-exchange.com/Programming/Languages/Scripting/JavaScript/Jquery/Q_24948577.html.*
Jsbin.com sandbox "aqine", date unknown. Retrieved from http://jsbin.com/aqine and http://jsbin.com/aqine/edit.*
No Author, Customise your Area-51 7500 Desktop PC—Alienware, Jan. 9, 2007, Alienware, pp. 1-9. Retrieved from http://web.archive.org/web/20070609162532/http://www.alienware.co.uk/configurator_pages/area-51_7500_r5.aspx?syscode=PC-EU-A51-7500-R5&subcode=SKU-DEFAULT.*
No Author, Microsoft Excel 2002, Mar. 30, 2004, Microsoft Corporation, Version 10.6501.6626 SP3, pp. 1-21.*
No Author, Summing up ways to add and count Excel data, Mar. 7, 2008, Microsoft Office Online, pp. 1-7. Originally at http://office.microsoft.com/en-us/excel/HA102157381033.aspx and retrieved from http://web.archive.org/web/20080307193127/http://office.microsoft.com/en-us/excel/HA102157381033.aspx.*
No Author; Sum the values in cells, columns, or rows; Dec. 20, 2008; Microsoft Office Online; pp. 1-22. Originally at http://office.microsoft.com/en-us/excel/HA102157381033.aspx?mode=print and retrieved from http://web.archive.org/web/20081220115825/http://office.microsoft.com/en-us/excel/HA102157381033.aspx?mode=print.*
Jelen, Bill; Excel Add a Certain Number to All Numbers in a Range Using Paste Special Add; Jul. 12, 2002; MrExcel.com; p. 1. Retrieved from http://www.mrexcel.com/td0132.html.*
No Author; Download details: Office XP Service Pack 3 (SP3); Mar. 30, 2004; Microsoft Download Center; p. 1. Retrieved from http://www.microsoft.com/downloads/en/details.aspx?FamilyID=85af7bfd-6f69-4289-8bd1-eb966bcdfb5e.*
OpenOffice.org 2.4.0 Calc; Mar. 27, 2008; OpenOffice.org; Version 2.4.0; pp. 1-20.*
Old Version of OpenOffice 2.4.0 Download—OldApps.com; Dec. 19, 2011; OldApps; pp. 1-4. Retrieved from http://www.oldapps.com/openoffice.php?old_openoffice=13.*
McCreesh, John; OpenOffice.org 2.4 released; Mar. 27, 2008; pp. 1-5. Retrieved from http://lwn.net/Articles/275302/.*
Merriam-Webster, or, No Date, Merriam-Webster.com, pp. 1-2. Retrieved from http://www.merriam-webster.com/dictionary/or.*
Makrini; Convert values or formulas to euros or another currency; Jun. 23, 2008; MrExcel Message Board; p. 1. Retrieved from http://www.mrexcel.com/forum/showpost.php?p=1603340&postcount=2.*
Microsoft Corporation; Microsoft Computer Dictionary; 2002; Microsoft Press; Fifth Edition; pp. 252, 341, 481.*
No Author, Microsoft Excel 2002, No Date, Microsoft Corporation, Version 10.6501.6626 SP3, pp. 1-21.*
"Apply formula to every cell in a column", Ozgrid Excel Help & Best Practices Forums, Ozgrid.com, Jan. 4, 2006, pp. 1-4.*

* cited by examiner

300

302 304

|   | A | B | C | D | E |
|---|---|---|---|---|---|
| 1 | Aaron | $30,000.00 | | | |
| 2 | Alice | $70,000.00 | | | |
| 3 | Betty | $80,000.00 | | | |
| 4 | Chara | $100,000.00 | | | |
| 5 | Denise | $110,000.00 | | | |
| 6 | Eva | $120,000.00 | | | |
| 7 | | | | | |
| 8 | | | | | |
| 9 | | | | | |

|   | A | B | | C | D | E |
|---|---|---|---|---|---|---|
| 1 | Aaron | -$50,000.00 | | | | |
| 2 | Alice | -$10,000.00 | | | | |
| 3 | ~~Betty~~ | ~~$0.00~~ | | | | |
| 4 | Chara | $20,000.00 | | | | |
| 5 | Denise | $30,000.00 | | | | |
| 6 | Eva | $40,000.00 | | | | |
| 7 | | | | | | |
| 8 | | | | | | |
| 9 | | | | | | |

| | A | B | □ | C | D | E | |
|---|---|---|---|---|---|---|---|
| 1 | Aaron | -$70,000.00 | | | | | ▲ |
| 2 | Alice | -$30,000.00 | | | | | |
| 3 | Betty | -$20,000.00 | | | | | |
| 4 | ~~Chara~~ | ~~$0.00~~ | | | | | |
| 5 | Denise | $10,000.00 | | | | | |
| 6 | Eva | $20,000.00 | | | | | |
| 7 | | | | | | | |
| 8 | | | | | | | ▼ |
| 9 | | | | | | | |

FIG. 5

AUTOMATED DYNAMIC DIFFERENTIAL DATA PROCESSING

BACKGROUND OF THE INVENTION

1. Field of the Invention

The present invention relates to systems and methods for determining and presenting differential data for elements of a data set. More particularly, the present invention relates to automated dynamic differential data processing.

2. Related Art

Graphical user interfaces (GUIs) provide users with an ability to open and view data sets, such as columnar data within a spreadsheet, and view data values for elements of the data set. A user may be able to use pre-defined formulas for execution on elements of data within the columns. For example, a spreadsheet program may provide a user with an ability to use a pre-defined sum formula on specified data elements within columns of data, a pre-defined subtraction formula on data elements within columns of data, and other pre-defined operations. The pre-defined formulas may be combined to form more complex formulas. Entry of these combined formulas requires knowledge of formula entry requirements for the program. A user may be required to enter granular details, such as cell addresses for data elements, to allow formulas to function properly. Accordingly, program-specific knowledge is required to enter formulas to operate upon data.

BRIEF SUMMARY OF THE INVENTION

The subject matter described herein provides automated dynamic differential data processing. A request for differential (e.g., distance) data relative to a first data element within a set of data elements is received from a user via a user input device, such as a mouse. The set of data elements may be a column, row, or other grouping of data. In response, a differential data value is calculated for each of the set of data elements relative to the first data element and displayed on a display. A second data element may be focused and the differential calculation performed against the second data element and a second set of differential data displayed. The original data values are stored and re-displayed upon loss of focus of a data element or termination of the request for differential data. As such, automated dynamic differential data processing is provided to allow fluid comparison of data elements within a data set. The user may define the distance formula via the input device to be used for the automated dynamic differential data processing based upon a data type association with elements within the set of data elements.

A method includes receiving, via a user input device, a request for differential data relative to a first data element within a plurality of data elements; calculating a first differential data value for each of the plurality of data elements relative to the first data element; and displaying the first differential data value for each of the plurality of data elements relative to the first data element on a display in response to the received request.

A system includes a display; a user input device; and a processor programmed to: receive, via the user input device, a request for differential data relative to a first data element within a plurality of data elements; calculate a first differential data value for each of the plurality of data elements relative to the first data element; and display the first differential data value for each of the plurality of data elements relative to the first data element on the display in response to the received request.

An alternative system includes a display; a user input device; a memory; and a processor programmed to: detect a differential data selection associated with a received request for differential data via a graphical user interface (GUI) displayed on the display and a first focus event associated with a first data element via the GUI in response to user manipulation of the user input device; highlight the first data element on the display; determine a data type associated with the first data element; apply a distance formula associated with the determined data type to the first data element paired with each of a plurality of data elements to calculate a first differential data value for each of the plurality of data elements relative to the first data element; store an original data value associated with each of the plurality of data elements in the memory; display the first differential data value for each of the plurality of data elements relative to the first data element on the display in response to the received request; detect a second focus event associated with a second data element of the plurality of data elements via the GUI; calculate a second differential data value for each of the plurality of data elements relative to the second data element; display the second differential data value for each of the plurality of data elements relative to the second data element on the display in response to the detected second focus event; retrieve the original data value associated with each of the plurality of data elements from the memory in response to at least one of a differential display timeout and an unfocus event associated with the first data element; and display the original data value associated with each of the plurality of data elements on the display.

A computer program product includes a computer useable medium including a computer readable program. The computer readable program when executed on a computer causes the computer to receive, via a user input device, a request for differential data relative to a first data element within a plurality of data elements; calculate a first differential data value for each of the plurality of data elements relative to the first data element; and display the first differential data value for each of the plurality of data elements relative to the first data element on a display in response to the received request.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description, serve to explain the principles of the invention.

FIG. 3 is an example of an implementation of a graphical user interface (GUI) of a consumer electronics device in an initial state that may be used for performing automated dynamic differential data processing according to an embodiment of the present subject matter;

FIG. 4 is an example of an implementation of the GUI of FIG. 3 after a user has defined a formula via a consumer electronics device for determining a distance between relative salary numbers for each of the employees and associated that formula with a set of data according to an embodiment of the present subject matter;

FIG. 5 is an example of an implementation of the GUI of FIG. 4 after a user, such as the manager, has moved a cursor via an input device to a new data cell within the GUI according to an embodiment of the present subject matter;

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated dynamic differential data processing. A request for differential (e.g., distance) data relative to a first data element within a set of data elements is received from a user via a user input device, such as a mouse. The set of data elements may be a column, row, or other grouping of data. In response, a differential data value is calculated for each of the set of data elements relative to the first data element and displayed on a display. A second data element may be focused and the differential calculation performed against the second data element and a second set of differential data displayed. The original data values are stored and re-displayed upon loss of focus of a data element or termination of the request for differential data. As such, automated dynamic differential data processing is provided to allow fluid comparison of data elements within a data set. The user may define the distance formula via the input device to be used for the automated dynamic differential data processing based upon a data type association with elements within the set of data elements.

The automated dynamic differential data processing described herein may be performed in real time to allow prompt differentiation of elements within sets of data. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
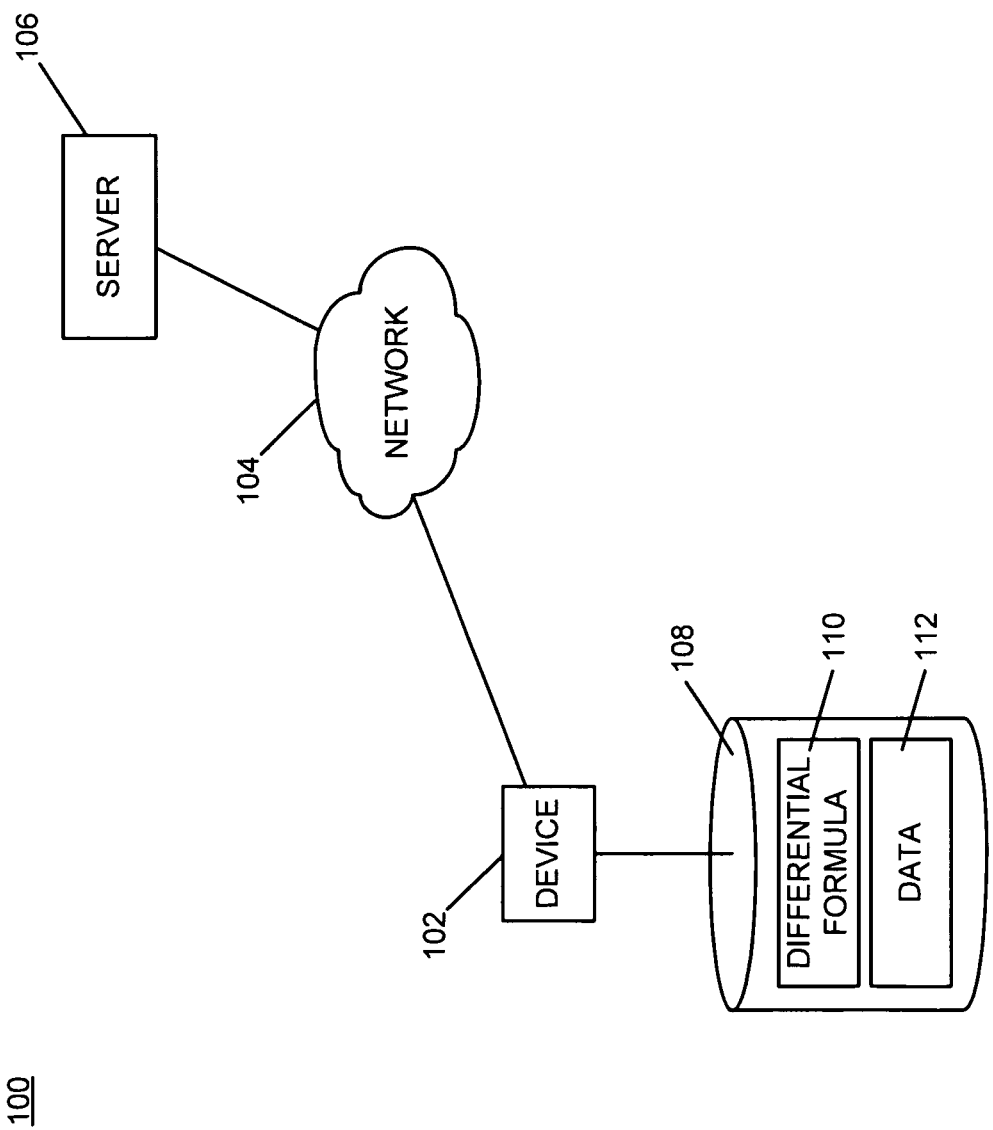
FIG. 1 is a block diagram of an example of an implementation of a system for automated dynamic differential data processing according to an embodiment of the present subject matter.

FIG. 1 is a block diagram of an example of an implementation of a system 100 for automated dynamic differential data processing. Within the system 100, a consumer electronics device 102 is shown connected via a network 104 to a server 106. As will be described in more detail below in association with FIG. 2 through FIG. 8, the consumer electronics device 102 provides automated dynamic differential data processing based upon user interactions with a graphical user interface (not shown) of the consumer electronics device 102.

It should be noted that the consumer electronics device 102 may be any computing device capable of processing information as described above and in more detail below. For example, the consumer electronics device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The server 106 may provide content for processing by the consumer electronics device 102. As such, the server 106 may include a web server or other content server for purposes of the present description. The network 104 may include any form of interconnection suitable for the intended purpose, including a private or public network such as an intranet or the Internet, respectively, direct inter-module interconnection, dial-up, wireless, or any other interconnection mechanism capable of interconnecting the consumer electronics device 102 to the server 106.

The consumer electronics device 102 is shown interconnected with a database 108. The database 108 provides storage capabilities for information associated with the automated dynamic differential data processing performed by the consumer electronics device 102. The database 108 includes a differential formula storage area 110 and a data storage area 112 that may be stored in the form of tables or other arrangements accessible by the consumer electronics device 102.

The differential formula storage area 110 includes storage for differential formula information associated with automated dynamic differential data processing, such as pre-defined and user-defined distance formulas for processing data to determine a distance between relative elements of a data set. For purposes of the present description, the term "distance" shall be defined to generally refer to any pre-defined or user-defined differential relationship between elements of a given data type. The user may define a distance (e.g., differential data) formula to be used for a data type based upon the user's perspective of distance that may be measured between elements of a given data type.

For example, a text data type may have phonetic distance, alphabetic distance, word/character frequency distance, or other distance relationships between characters or words associated with the text data type and corresponding distance formulas may be defined to measure these distances. A numeric data type may have algebraic or other distance relationships between numeric values associated with the numeric data type and corresponding distance formulas may be defined to measure these distances. A location data type may have travel distance, flight distance, or other distance relationships between location values associated with the location data type and corresponding distance formulas may be defined to measure these distances. An image data type may have red/green/blue (RGB) distances, hue distances for differences between corresponding pixel values, content distances for use in finding objects in different images, and other distance relationships between image elements or portions of image elements associated with the image data type and corresponding distance formulas may be defined to measure these distances. Accordingly, the automated dynamic differential data processing is configurable by a user of a device, such as the consumer electronics device 120, and may be based upon a data type for a set of data elements. Many other examples of data types for automated dynamic differential data processing are possible and all are considered within the scope of the present subject matter.

The data storage area 112 includes additional information associated with automated dynamic differential data processing, such as information regarding associations between data types and defined distance formulas that may be used to process the respective data types to determine differential data relationships between elements of the respective data types. It should be noted that a user may define data types for use by the consumer electronics device 102 for differential data processing, associations between data types, and distance formulas based upon the subject matter described herein. These data types, associations between the data types, and the distance formulas are examples of information that may be stored within the data storage area 112.

Figure 2:
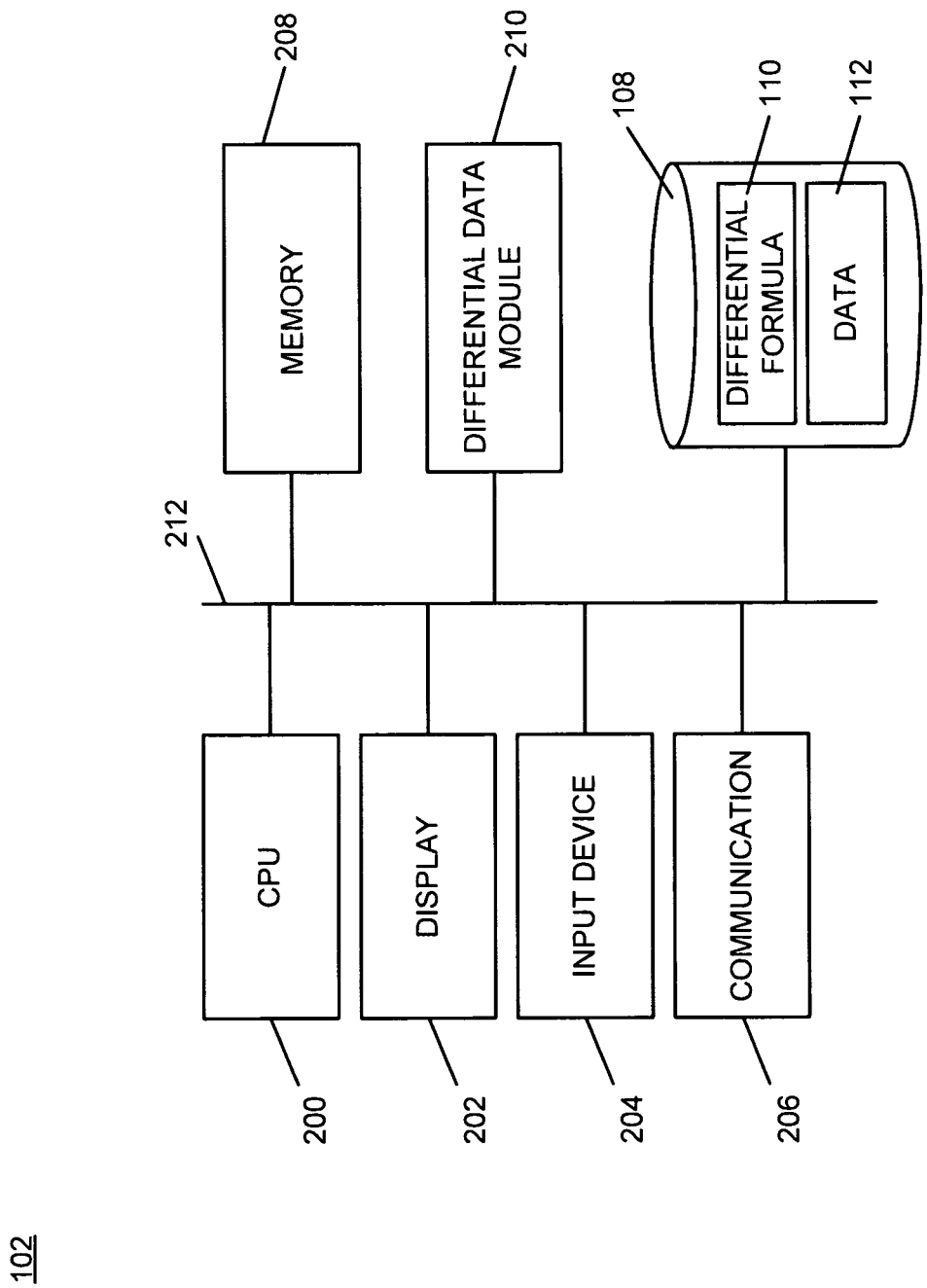
FIG. 2 is a block diagram of an example of an implementation of a consumer electronics device that is capable of performing automated dynamic differential data processing according to an embodiment of the present subject matter.

FIG. 2 is a block diagram of an example of an implementation of the consumer electronics device 102 that is capable of performing automated dynamic differential data processing. A central processing unit (CPU) 200 provides computer instruction execution, computation, and other capabilities within the consumer electronics device 102. A display 202 provides visual information to a user of the consumer electronics device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

A communication module 206 provides interconnection capabilities that allow the consumer electronics device 102 to communicate with other modules within the system 100, such as the server 106 to retrieve content for processing. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 includes any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 also includes interrupt-level, stack-level, and application-level modules as appropriate. Furthermore, the communication module 206 includes any memory components used for storage, execution, and data processing for performing processing activities associated with the communication module 206. The communication module 206 may also form a portion of other circuitry described without departure from the scope of the present subject matter.

A memory 208 provides storage capabilities for the consumer electronics device 102. It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A differential data module 210 provides processing capabilities for the automated dynamic differential data processing within the consumer electronics device 102. As will be described in more detail below, the differential data module 210 may read formulas and associated data from the differential formula storage area 110 and the data storage area 112 stored within the database 108. Though the differential data module 210 is illustrated as a component-level module for ease of illustration and description purposes, it should be noted that the differential data module 210 includes any hardware, programmed processor(s), and memory used to carry out the functions of the differential data module 210 as described above and in more detail below. For example, the differential data module 210 may include additional controller circuitry in the form of application specific integrated circuits (ASICs), processors, and/or discrete integrated circuits and components for performing communication and electrical control activities associated with the differential data module 210. Additionally, the differential data module 210 also includes interrupt-level, stack-level, and application-level modules as appropriate. Furthermore, the differential data module 210 includes any memory components used for storage, execution, and data processing for performing processing activities associated with the differential data module 210. The differential data module 210 may also form a portion of other circuitry described without departure from the scope of the present subject matter.

The CPU 200, the display 202, the input device 204, the communication module 206, the memory 208, the differential data module 210, and the database 108 are interconnected via an interconnection 212. The interconnection 212 may include a system bus, a network, or any other interconnection capable of providing the respective components with suitable interconnection for the respective purpose.

While the consumer electronics device 102 is illustrated with and has certain components described, other modules and components may be associated with the consumer electronics device 102 without departure from the scope of the present subject matter. Additionally, it should be noted that, while the consumer electronics device 102 is described as a single device for ease of illustration purposes, the components within the consumer electronics device 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the consumer electronics device 102 are possible and all are considered within the scope of the present subject matter. It should also be understood that, though the differential formula storage area 110 and the data storage area 112 are shown within the database 108, they may also be stored within the memory 208 without departure from the scope of the present subject matter.

Accordingly, the consumer electronics device 102 may take many forms and may be associated with many platforms.

FIG. 3 through FIG. 5 described below illustrate an example of the automated dynamic differential data processing capabilities of the consumer electronics device 102 in the form of a sequence of graphical user interface (GUI) representations. The GUI representations within the example of FIG. 3 through FIG. 5 are in the form of a spreadsheet user interface for ease of illustration purposes. However, it is understood that many other variations on the example GUI representations are possible, including applications other than spreadsheet applications, and all are considered within the scope of the present subject matter. The example GUI representations may be displayed by devices, such as the display device 202, associated with computing devices. Input associated with processing illustrated within the example GUI representations may be generated by a user via input devices, such as the input device 204. For ease of illustration purposes, the display device 202 and the input device 204 are not represented within FIG. 3 through FIG. 5.

FIG. 3 is an example of an implementation of a graphical user interface (GUI) 300 of a consumer electronics device, such as the consumer electronics device 102, in an initial state that may be used for performing automated dynamic differential data processing. For ease of illustration purposes, the GUI 300 includes only two columns of data. However, it is understood that the present subject matter may be applied to a variety of different types and sets of data. A column_A 302 includes a list of names and a column_B 304 includes a list of numbers. As can be seen from FIG. 3, each line in the column_A 302 is paired with a numeric value in the column_B 304. For purposes of the present example, it is assumed that the numeric values within the column_B 304 represent an annual salary for a given employee associated with each name within a column_A 302. Accordingly, within the present example, an employee Aaron in row_1 306 earns $30,000.00 per year. Similarly, an employee Alice in row_2 308 earns $70,000.00 per year, an employee Betty in row_3 310 earns $80,000.00 per year, an employee Chara in row_4 312 earns $100,000.00 per year, an employee Denise in row_5 314 earns $110,000.00 per year, and an employee Eva in row_6 316 earns $120,000.00 per year.

Based upon this example set of data, the automated dynamic differential data processing capabilities associated with the present subject matter implemented by a device, such as the consumer electronics device 102, will now be described in more detail. Additionally, for purposes of the present example, it will be assumed that a user viewing this data is a manager of each of the employees in the column_A 302. If the manager is interested, for example, in determining a deviation or distance between each employee's respective salary and the salary of each other employee, the automated dynamic differential data processing capabilities of the present subject matter implemented by the consumer electronics device 102 provide a way for the manager to determine this information without entering a formula associated with each cell or cell pair. The manager may define a formula one time via the consumer electronics device 102 and have it dynamically applied to elements of the set of data, as described in more detail below.

FIG. 4 is an example of an implementation of the GUI 300 of FIG. 3 after the user, such as the manager, has defined a formula via a consumer electronics device, such as the consumer electronics device 102, for determining a distance between the relative salary numbers for each of the employees in the column_A 302 and associated that formula with the set of data represented within column_B 304. For purposes of the present example, it assumed that the distance formula defined for the column_B 304 is subtraction of neighboring cells from a highlighted cell. However it is understood that any distance formula suitable for the represented data may be used without departure from the scope of the present subject matter.

As can be seen from FIG. 4, an icon 400 is represented in a header area 402 of the column_B 304. For ease of illustration purposes, the icon 400 is represented as a square within FIG. 4. However it is understood that an icon, such as the icon 400, may be represented in any form, including variations in color, size, or shape, to indicate to the manager that the formula associated with the column_B 304 has been successfully defined and associated with a given portion of the set of data. It is also assumed for purposes of the present example, that the manager has selected the icon 400 with a cursor 404 and has moved the cursor 404 via an input device, such as the input device 204, into a data area of the column_B 304 represented by the row_1 306 through the row_6 316. For purposes of the present example, it is assumed that the manager has selected the icon 400 with a selection associated with the input device 204, such as a left mouse button, and holds that selection throughout the example until indicated below.

As the manager moves the cursor 404 within the column_B 304, the consumer electronics device 102 automatically applies the defined distance formula associated with the column_B 304 to elements within the set of data. Accordingly, as can be seen from FIG. 4, the cursor 404 has been moved by the consumer electronics device 102 in response to input actions by the manager to a cell that represents an intersection of the row_3 310 and the column_B 304. To provide feedback to the manager that the automated dynamic differential data processing is presently active, the row_3 310 is highlighted by a dashed line 406 within the present example. However, it should be noted that while the present example utilizes the dashed line 406 to highlight the row_3 310, this should not be considered limiting, as any form of highlighting a data cell or row associated with application of a distance formula may be utilized without departure from the scope of the present subject matter.

As additional feedback to the manager, the data value of $80,000.00 that was previously in the column_B 304 at the row_3 310 has been changed by the consumer electronics device 102 to $0.00 (zero). This value of $0.00 associated with the highlighted cell within the column_B 304 represents an application of the defined distance formula for the column_B 304 applied to the original data of $80,000.00 with $80,000.00 as the differential input data, yielding in a distance of $0.00. Similarly, each cell within the column_B 304 that previously included data representing a salary number has also been modified based upon the automated dynamic differential data processing through application of the defined distance formula for each salary value relative to the highlighted salary value within the column_B 304 at the row_3 310. Accordingly, based upon the present example, the manager may readily determine that Aaron makes $50,000.00 less than Betty. By comparison, the manager may also determine that Eva makes $40,000.00 more than Betty. In both example situations, the automated dynamic differential data processing of the consumer electronics device 102 allowed the manger to determine a distance between the respective data elements without defining a formula at each respective data cell.

FIG. 5 is an example of an implementation of the GUI 300 of FIG. 4 after a user, such as the manager, has moved the cursor 404 via an input device, such as the input device 204, to a new data cell within the GUI 300. As can be seen from FIG. 5, the manager has moved the cursor 404 via the input device 204 within the column_B 304 to a data cell that represents an intersection between the column_B 304 and the row_4 312. Accordingly, as described above in association with FIG. 4 for the row_3 310, the row_4 312 has been highlighted with a dashed line 500 and the defined distance formula associated with the column_B 304 has been applied against the data within the intersected cell and this value has been changed to represent a distance of $0.00 (zero). Accordingly, as described above in association with FIG. 4, based upon this movement of the cursor 404, the manager may readily determine that the employee Aaron makes $70,000.00 less than the employee Chara and that the employee Eva, by comparison, makes $20,000.00 more. By continuing to move the cursor 404, the manager may utilize the automated dynamic differential data processing of the consumer electronics device 102 to readily compare employee salaries. The consumer electronics device 102 continues automated dynamic differential data processing within the present example, until the manager releases an element associated with the input device 204, such as a left mouse button.

It should also be noted that the differential data displayed upon application of the defined distance formula does not destroy the initial data associated with the cells. Accordingly, upon release of a selection element associated with the cursor 404, such as a left mouse button associated with the input device 204, the original data is re-populated by the consumer electronics device 102 within the cells of the column_B 304 and the data returns to the representation illustrated in FIG. 3 described above.

Based upon the example of FIG. 3 through FIG. 5, it can be seen that a distance formula may be defined for and applied to a set of data at the consumer electronics device 102. It can further be seen that each data element within the set may be operated upon dynamically and the distance formula applied relative to each data element to determine a distance associated with each data element relative to each other data element within the set. Additionally, application of the defined distance formula on the data is non-destructive. Accordingly, data within the data set does not need to be reconstructed upon completion of the automated dynamic differential data processing associated with the present subject matter.

Figure 6:
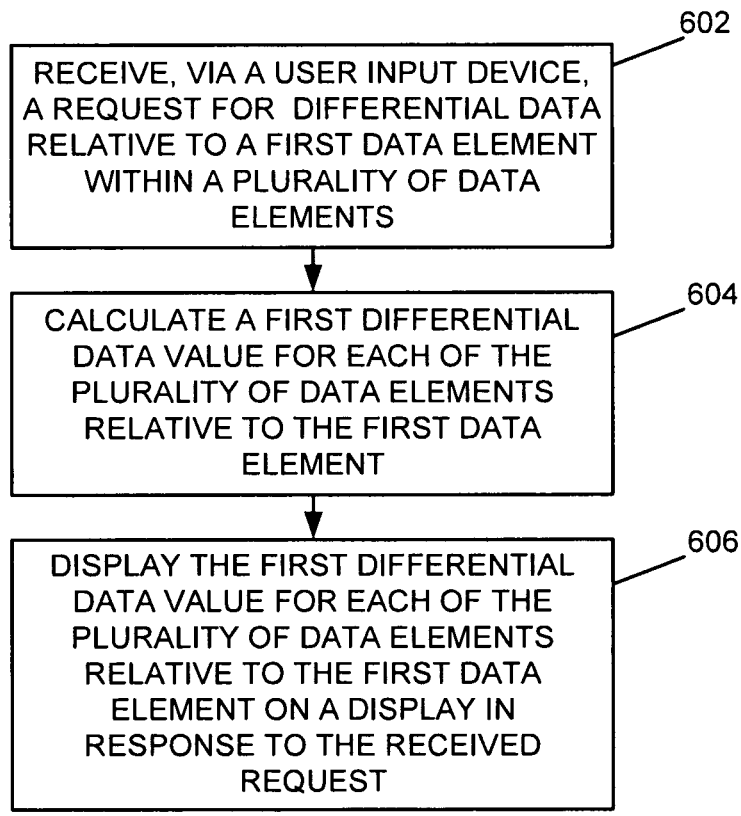
FIG. 6 is a flow chart of an example of an implementation of a process for providing automated dynamic differential data processing for users of a consumer electronics device according to an embodiment of the present subject matter.
Figure 7:
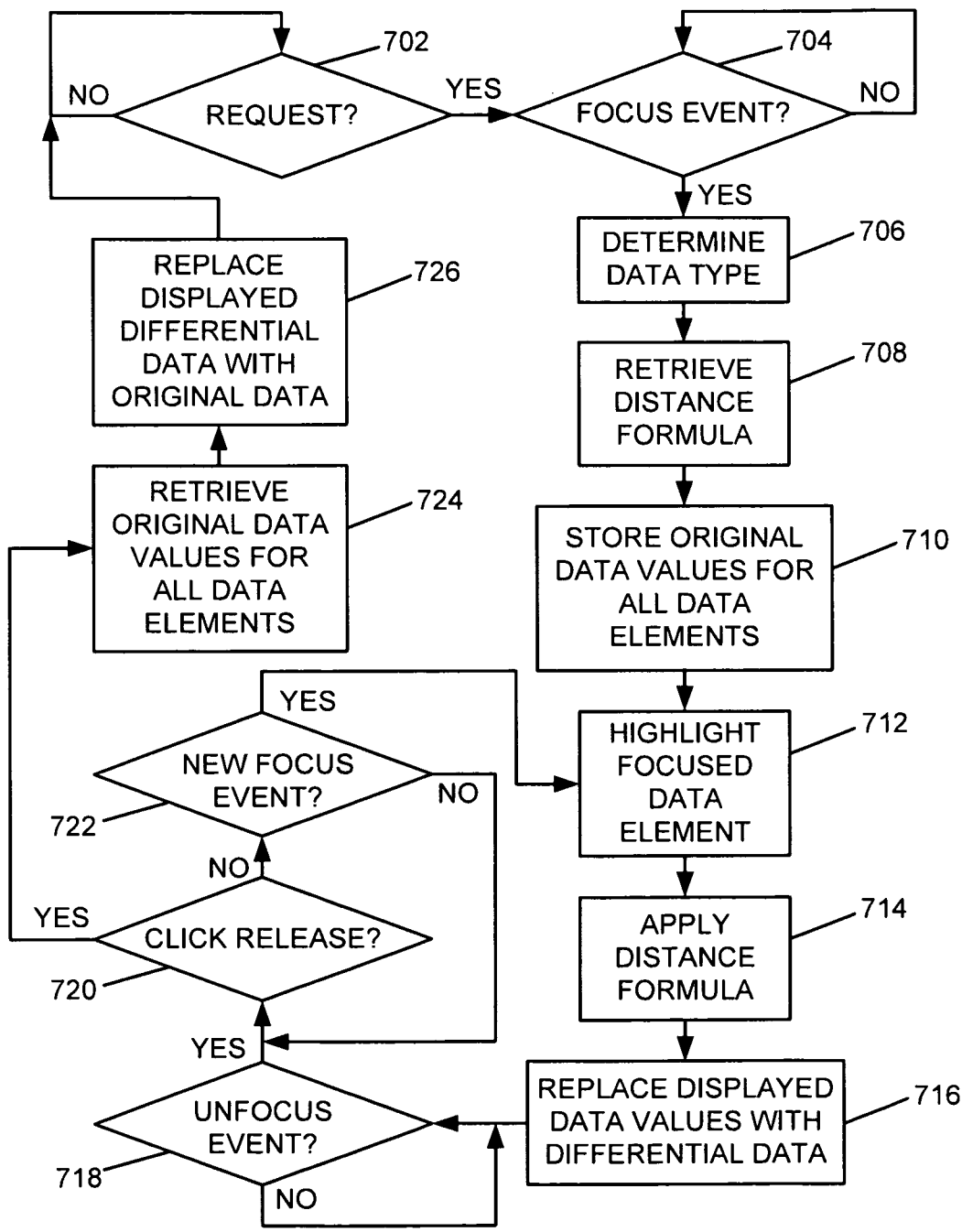
FIG. 7 is a flow chart of an example of an implementation of a process for providing automated dynamic differential data processing in response to focus events and select events associated with an input device and a graphical user interface (GUI) of FIG. 3 through FIG. 5 according to an embodiment of the present subject matter.
Figure 8:
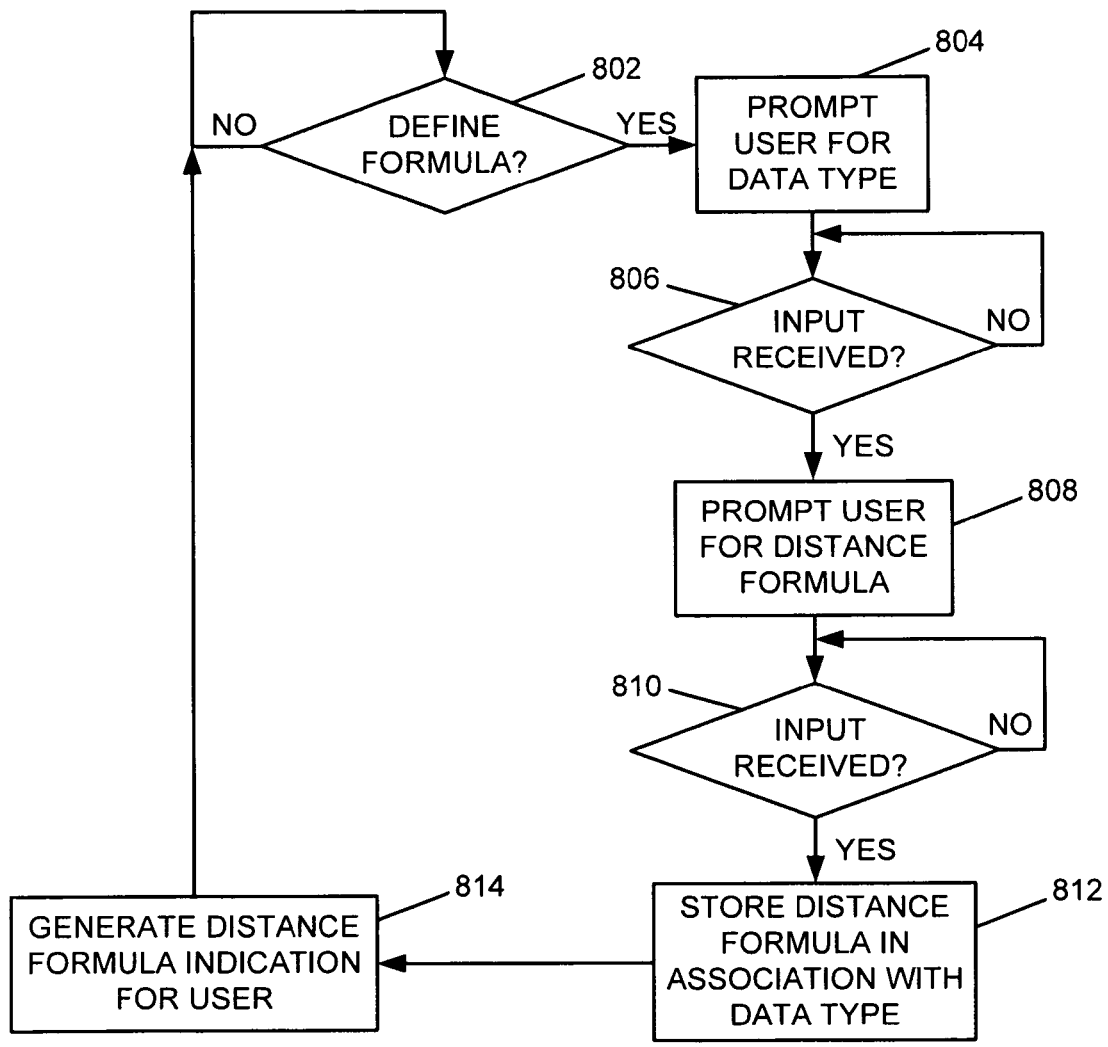
FIG. 8 is a flow chart of an example of an implementation of a process that may be used to allow a user to define a distance formula and associate that distance formula with a data type according to an embodiment of the present subject matter.

FIG. 6 through FIG. 8 below describe example processes that may be executed by computing devices, such as the consumer electronics device 102, to perform the automated dynamic differential data processing associated with the present subject matter. Many other variations on the example processes are possible and all are considered within the scope of the present subject matter. The example processes may be performed by modules, such as the differential data module 210 and/or executed by the CPU 200, associated with computing devices. It should be noted that time-out procedures and other error control procedures are not illustrated within the example processes described below for ease of illustration purposes. However, it is understood that all such procedures are considered to be within the scope of the present subject matter.

FIG. 6 is a flow chart of an example of an implementation of a process 600 for providing automated dynamic differential data processing for users of a consumer electronics device, such as the consumer electronics device 102. At block 602, the process 600 receives, via a user input device, a request for differential data relative to a first data element within a plurality of data elements. At block 604, the process 600 calculates a first differential data value of each of the plurality of data elements relative to the first data element. At block 606, the process 600 displays the first differential data value for each of the plurality of data elements relative to the first data element on a display in response to the received request.

FIG. 7 is a flow chart of an example of an implementation of a process 700 for providing automated dynamic differential data processing in response to focus events and select events associated with an input device, such as the input device 204, and a graphical user interface (GUI), such as the GUI 300 of FIG. 3 through FIG. 5. The process 700 waits at decision point 702 until a request for differential data is received. The request may also include detecting a differential data selection associated with the received request for differential data via a graphical user interface (GUI), such as the GUI 300, displayed on a display, such as the display device 202. As such, the request, for example, may be a mouse click by the user selecting a left mouse button over an icon, such as the icon 400 described above in association with the GUI 300, and this mouse click may be detected by the CPU 200. It is additionally noted that, for purposes of the present example, it is assumed that the user holds the left mouse button in the selected state until released as described below. Accordingly, as a user moves a cursor, such as the cursor 404 associated with the mouse, data elements may be focused when the cursor 404 is moved over the respective data elements within the GUI 300.

Upon receipt of a request for differential data at decision point 702, the process 700 waits at decision point 704 for a focus event associated with the GUI 300. When a determination is made that a focus event has been detected, the process 700 makes a determination as to a data type associated with the focused data element at block 706. At block 708, the process 700 retrieves a defined distance formula associated with the data type of the data element that is the subject of the focus event. The distance formula may be retrieved, for example, from the differential formula storage area 110 within the database 108 or from the memory 208, as described above. At block 710, the process 700 stores original data values for all data elements associated with the focused data element, including the data value of the focused data element. These data values may be stored within the data storage area 112 of the database 108, within the memory 208, or within another data storage area without departure from the scope of the present subject matter.

At block 712, the process 700 highlights the focused data element. At block 714, the process 700 applies the defined distance formula to the focused data element paired with each other data element within the set to calculate a differential data value for each element of the set of data elements relative to the focused data element. At block 716, the process 700 replaces displayed data values associated with the set of data elements with calculated differential data resulting from application of the distance formula for the focused data element paired with each other data element within the set.

At decision point 718, the process 700 waits for an unfocused event associated with the focused data element. When a determination is made that an unfocused event has been received, the process 700 makes a determination at decision point 720 as to whether the user has released the selected and held left mouse button. When a determination is made that the user has not released a mouse button, the process 700 makes a determination at decision point 722 as to whether a new (e.g., second or subsequent) focus event has been detected. When a determination is made that a new focus event has not been received, the process 700 iterates between decision point 720 and decision point 722 to determine whether the left mouse button has been released or a new focus event has been received, respectively.

When a determination is made at decision point 722 that a new focus event has been detected, the process 700 continues processing as described above beginning with block 712. As described above, the defined distance formula is applied based upon the new focused data element against all data elements in the set to calculate a new (e.g., second or subsequent) differential data value for each element of the set of data elements relative to the focused data element. This processing may continue until the user releases the left mouse button.

When a determination is made at decision point 720 that the user has released the left mouse button, the process 700 retrieves the original data values for all data elements from a memory, such as the data storage area 112 within the database 108, the memory 208, or another data storage area, at block 724. At block 726, the process 700 replaces the displayed differential data with the original data and the process 700 returns to decision point 702 to await a new automated dynamic differential data processing request.

FIG. 8 is a flow chart of an example of an implementation of a process 800 that may be used to allow a user to define a distance formula via a device, such as the consumer electronics device 102, and associate that distance formula with a data type. The process 800 waits at decision point 802 for a user to initiate a request to define a distance formula via a device, such as the input device 204. When a determination is made that a request to define a distance formula has been received, the process 800 prompts the user for a data type at block 804. The process 800 waits at decision point 806 for the data type input to be received.

When a determination is made that the data type input has been received, the process 800 prompts the user for a distance formula at block 808. The process 800 waits at decision point 810 for the distance formula input to be received. When a determination is made that the distance formula input has been received, the process 800 stores the received distance formula in association with the data type at block 812. As described above, the distance formula may be stored within the differential formula storage area 110 of the database 108. Similarly, the associated data type and the association between the data type and the defined distance formula may be stored in the data storage area 112 of the database 108. Alternatively, the defined distance formula and the associated data type may be stored within the memory 208 or other data storage area without departure from the scope of the present subject matter. At block 814, the process 800 generates and displays a distance formula indication for the user to indicate that the differential data formula is defined in association with a set of data elements associated with the data type. For example, an icon, such as the icon 400 described above in association with FIG. 4, may be used to indicate to the user that the distance formula has been defined for a given set of data. The process 800 returns to decision point 802 to await a new request to define a distance formula.

As described above in association with FIG. 1 through FIG. 8, the example systems and processes provide automated dynamic differential data processing. Many other variations and additional activities associated with differential data processing are possible and all are considered within the scope of the present subject matter.

Those skilled in the art will recognize, upon consideration of the above teachings, that certain of the above examples are based upon use of a programmed processor, such as CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable storage medium(s) may be utilized. The computer-usable or computer-readable storage medium may be, for example but not limited to, an electronic, magnetic, optical, electromagnetic, infrared, or semiconductor system, apparatus, or device medium. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain, store, communicate, or transport the program for use by or in connection with the instruction execution system, apparatus, or device.

Computer program code for carrying out operations of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
    receiving, via a user input device, a request for differential data;
    detecting a graphical user interface (GUI) focus event that indicates a GUI cursor has been moved over a first data element of a plurality of data elements relative to which to apply a user-defined differential data formula that specifies a differential calculation selected based upon a data type of the plurality of data elements;
    calculating, in response to detecting the GUI focus event that indicates the GUI cursor has been moved over the first data element, via the user-defined differential data formula using each data value associated with each data element of the plurality of data elements as differential input data, a first differential data value for each of the plurality of data elements relative to a data value of the first data element; and
    displaying the first differential data value for each of the plurality of data elements at an original display location of each of the plurality of data elements on a display in response to the received request.

2. The method of claim 1:
    further comprising highlighting the first data element at the original display location of the first data element on the display; and
    where:
        receiving, via the user input device, the request for differential data comprises detecting a differential data icon selection within the GUI associated with the received request for differential data via the user input device; and
        detecting the GUI focus event that indicates the GUI cursor has been moved over the first data element of the plurality of data elements relative to which to apply the user-defined differential data formula that specifies the differential calculation selected based upon the data type of the plurality of data elements comprises detecting a first GUI focus event associated with the first data element at the original display location of the first data element via the GUI in response to user manipulation of the user input device.

3. The method of claim 2, further comprising:
    detecting a second GUI focus event that indicates that the GUI cursor has been moved over the original display location of a second data element of the plurality of data elements;
    calculating, in response to detecting the second GUI focus event that indicates that the GUI cursor has been moved over the original display location of the second data element, via the user-defined differential data formula using each data value associated with each data element of the plurality of data elements as differential input data, a second differential data value for each of the plurality of data elements relative to a data value of the second data element; and
    displaying the second differential data value for each of the plurality of data elements at the original display location of each of the plurality of data elements on the display in response to the detected second GUI focus event.

4. The method of claim 1, where calculating, in response to detecting the GUI focus event that indicates the GUI cursor has been moved over the first data element, via the user-defined differential data formula using each data value associated with each data element of the plurality of data elements as differential input data, the first differential data value for each of the plurality of data elements relative to the data value of the first data element comprises:
  determining a data type associated with the first data element;
  retrieving, in response to determining the data type associated with the first data element, a defined distance formula associated with the determined data type of the first data element that is a subject of the detected GUI focus event; and
  applying the defined distance formula associated with the determined data type using the data value of the first data element and the data value of each of the plurality of data elements as the differential input data to obtain the first differential data value for each of the plurality of data elements.

5. The method of claim 4, where applying the defined distance formula associated with the determined data type using the data value of the first data element paired with itself yields a differential data value of zero.

6. The method of claim 1, where displaying the first differential data value for each of the plurality of data elements at an original display location of each of the plurality of data elements on a display in response to the received request comprises:
  storing an original data value associated with each of the plurality of data elements in a memory; and
  displaying the first differential data value associated with each of the plurality of data elements on the display at the original display location of each original data value associated with each of the plurality of data elements.

7. The method of claim 6, further comprising:
  retrieving the original data value associated with each of the plurality of data elements from the memory in response to at least one of a differential display timeout and a GUI unfocus event associated with the first data element that indicates the GUI cursor has been moved away from a display location of the first data element; and
  displaying the original data value associated with each of the plurality of data elements on the display at the original display location of each original data value associated with each of the plurality of data elements.

8. The method of claim 1, further comprising:
  receiving the user-defined differential data formula from a user via the user input device defined by the user based upon the data type of the plurality of data elements;
  associating the user-defined differential data formula with the data type of the plurality of data elements; and
  displaying an indicator on the display in association with the plurality of data elements indicating that the user-defined differential data formula is defined in association with the data type of the plurality of data elements.

9. A system, comprising:
  a display;
  a user input device; and
  a processor programmed to:
    receive, via the user input device, a request for differential data;
    detect a graphical user interface (GUI) focus event that indicates a GUI cursor has been moved over a first data element of a plurality of data elements relative to which to apply a user-defined differential data formula that specifies a differential calculation selected based upon a data type of the plurality of data elements;
    calculate, in response to detecting the GUI focus event that indicates the GUI cursor has been moved over the first data element, via the user-defined differential data formula using each data value associated with each data element of the plurality of data elements as differential input data, a first differential data value for each of the plurality of data elements relative to a data value of the first data element; and
    display the first differential data value for each of the plurality of data elements at an original display location of each of the plurality of data elements on the display in response to the received request.

10. The system of claim 9:
  where the processor is further programmed to highlight the first data element at the original display location of the first data element on the display; and
  where:
    in being programmed to receive, via the user input device, the request for differential data, the processor is programmed to detect a differential data icon selection within the GUI associated with the received request for differential data via the user input device; and
    in being programmed to detect the GUI focus event that indicates the GUI cursor has been moved over the first data element of the plurality of data elements relative to which to apply the user-defined differential data formula that specifies the differential calculation selected based upon the data type of the plurality of data elements, the processor is programmed to detect a first GUI focus event associated with the first data element at the original display location of the first data element via the GUI in response to user manipulation of the user input device.

11. The system of claim 10, where the processor is further programmed to:
  detect a second GUI focus event that indicates that the GUI cursor has been moved over the original display location of a second data element of the plurality of data elements;
  calculate, in response to detecting the second GUI focus event that indicates that the GUI cursor has been moved over the original display location of the second data element, via the user-defined differential data formula using each data value associated with each data element of the plurality of data elements as differential input data, a second differential data value for each of the plurality of data elements relative to a data value of the second data element; and
  display the second differential data value for each of the plurality of data elements at the original display location of each of the plurality of data elements on the display in response to the detected second GUI focus event.

12. The system of claim 9, where in being programmed to calculate, in response to detecting the GUI focus event that indicates the GUI cursor has been moved over the first data element, via the user-defined differential data formula using each data value associated with each data element of the plurality of data elements as differential input data, the first differential data value for each of the plurality of data elements relative to the data value of the first data element, the processor is programmed to:
  determine a data type associated with the first data element;
  retrieve, in response to determining the data type associated with the first data element, a defined distance formula associated with the determined data type of the first data element that is a subject of the detected GUI focus event; and apply the defined distance formula associated with the determined data type using the data value of the first data element and the data value of each of the plurality of data elements as the differential input data to obtain the first differential data value for each of the plurality of data elements.

13. The system of claim 12, where in being programmed to apply the defined distance formula associated with the determined data type using the data value of the first data element paired with itself, the processor is further programmed to yield a differential data value of zero.

14. The system of claim 9, further comprising:
a memory; and
where in being programmed to display the first differential data value for each of the plurality of data elements at an original display location of each of the plurality of data elements on a display in response to the received request, the processor is programmed to:
  store an original data value associated with each of the plurality of data elements in the memory; and
  display the first differential data value associated with each of the plurality of data elements on the display at the original display location of each original data value associated with each of the plurality of data elements.

15. The system of claim 14, where the processor is further programmed to:
retrieve the original data value associated with each of the plurality of data elements from the memory in response to at least one of a differential display timeout and a GUI unfocus event associated with the first data element that indicates the GUI cursor has been moved away from a display location of the first data element; and
display the original data value associated with each of the plurality of data elements on the display at the original display location of each original data value associated with each of the plurality of data elements.

16. The system of claim 9, where the processor is further programmed to:
receive the user-defined differential data formula from a user via the user input device defined by the user based upon the data type of the plurality of data elements;
associate the user-defined differential data formula with the data type of the plurality of data elements; and
display an indicator on the display in association with the plurality of data elements indicating that the user-defined differential data formula is defined in association with the data type of the plurality of data elements.

17. A system, comprising:
a display;
a user input device;
a memory; and
a processor programmed to:
  detect a differential data icon selection within a graphical user interface (GUI) associated with a received request for differential data displayed on the display and a first GUI focus event associated with a first data element of a plurality of data elements that indicates a GUI cursor has been moved over the first data element in response to user manipulation of the user input device;
  highlight the first data element at an original display location of the first data element on the display;
  determine a data type associated with the first data element;
  retrieving, in response to determining the data type associated with the first data element, a user-defined distance formula associated with the determined data type of the first data element that is a subject of the detected GUI focus event;
  apply the user-defined distance formula associated with the determined data type using a data value of the first data element paired with itself and paired with each of the plurality of data elements to calculate a first differential data value for each of the plurality of data elements relative to the first data element;
  store an original data value associated with each of the plurality of data elements in the memory;
  display the first differential data value for each of the plurality of data elements at an original display location of each of the plurality of data elements on the display in response to the received request;
  detect a second GUI focus event that indicates that the GUI cursor has been moved over the original display location of a second data element of the plurality of data elements;
  calculate, via the user-defined distance formula, a second differential data value for each of the plurality of data elements relative to the second data element;
  display the second differential data value for each of the plurality of data elements at the original display location of each of the plurality of data elements on the display in response to the detected second GUI focus event;
  retrieve the original data value associated with each of the plurality of data elements from the memory in response to at least one of a differential display timeout and a GUI unfocus event associated with one of the first and second data elements; and
  display the original data value associated with each of the plurality of data elements at the original display location of each of the plurality of data elements on the display.

18. A computer program product comprising a computer useable storage device including a computer readable program, where the computer readable program when executed on a computer causes the computer to:
receive, via a user input device, a request for differential data;
detect a graphical user interface (GUI) focus event that indicates a GUI cursor has been moved over a first data element of a plurality of data elements relative to which to apply a user-defined differential data formula that specifies a differential calculation selected based upon a data type of the plurality of data elements;
calculate, in response to detecting the GUI focus event that indicates the GUI cursor has been moved over the first data element, via the user-defined differential data formula using each data value associated with each data element of the plurality of data elements as differential input data, a first differential data value for each of the plurality of data elements relative to a data value of the first data element; and
display the first differential data value for each of the plurality of data elements at an original display location of each of the plurality of data elements on a display in response to the received request.

19. The computer program product of claim 18:
where the computer readable program when executed on the computer further causes the computer to highlight the first data element at the original display location of the first data element on the display; and where:
    in causing the computer to receive, via the user input device, the request for differential data, the computer readable program when executed on the computer causes the computer to detect a differential data icon selection within the GUI associated with the received request for differential data the user input device; and
    in causing the computer to detect the GUI focus event that indicates the GUI cursor has been moved over the first data element of the plurality of data elements relative to which to apply the user-defined differential data formula that specifies the differential calculation selected based upon the data type of the plurality of data elements, the computer readable program when executed on the computer causes the computer to detect a first GUI focus event associated with the first data element at the original display location of the first data element via the GUI in response to user manipulation of the user input device.

20. The computer program product of claim 19, where the computer readable program when executed on the computer further causes the computer to:
    detect a second GUI focus event that indicates that the GUI cursor has been moved over the original display location of a second data element of the plurality of data elements;
    calculate, in response to detecting the second GUI focus event that indicates that the GUI cursor has been moved over the original display location of the second data element, via the user-defined differential data formula using each data value associated with each data element of the plurality of data elements as differential input data, a second differential data value for each of the plurality of data elements relative to a data value of the second data element; and
    display the second differential data value for each of the plurality of data elements at the original display location of each of the plurality of data elements on the display in response to the detected second GUI focus event.

21. The computer program product of claim 18, where in causing the computer to calculate, in response to detecting the GUI focus event that indicates the GUI cursor has been moved over the first data element, via the user-defined differential data formula using each data value associated with each data element of the plurality of data elements as differential input data, the first differential data value for each of the plurality of data elements relative to the data value of the first data element, the computer readable program when executed on the computer causes the computer to:
    determine a data type associated with the first data element;
    retrieve, in response to determining the data type associated with the first data element, a defined distance formula associated with the determined data type of the first data element that is a subject of the detected GUI focus event; and
    apply the defined distance formula associated with the determined data type using the data value of the first data element and the data value of each of the plurality of data elements as the differential input data to obtain the first differential data value for each of the plurality of data elements.

22. The computer program product of claim 21, where in causing the computer to apply the defined distance formula associated with the determined data type using the data value of the first data element paired with itself, the computer readable program when executed on the computer further causes the computer to yield a differential data value of zero.

23. The computer program product of claim 18, where in causing the computer to display the first differential data value for each of the plurality of data elements at an original display location of each of the plurality of data elements on a display in response to the received request, the computer readable program when executed on the computer causes the computer to:
    store an original data value associated with each of the plurality of data elements in a memory; and
    display the first differential data value associated with each of the plurality of data elements on the display at the original display location of each original data value associated with each of the plurality of data elements.

24. The computer program product of claim 23, where the computer readable program when executed on the computer further causes the computer to:
    retrieve the original data value associated with each of the plurality of data elements from the memory in response to at least one of a differential display timeout and a GUI unfocus event associated with the first data element that indicates the GUI cursor has been moved away from a display location of the first data element; and
    display the original data value associated with each of the plurality of data elements on the display at the original display location of each original data value associated with each of the plurality of data elements.

25. The computer program product of claim 18, where the computer readable program when executed on the computer further causes the computer to:
    receive the user-defined differential data formula from a user via the user input device defined by the user based upon the data type of the plurality of data elements;
    associate the user-defined differential data formula with the data type of the plurality of data elements; and
    display an indicator on the display in association with the plurality of data elements indicating that the user-defined differential data formula is defined in association with the data type of the plurality of data elements.

\* \* \* \* \*